(12) United States Patent
Aymard et al.

(10) Patent No.: US 8,337,758 B2
(45) Date of Patent: Dec. 25, 2012

(54) IN VITRO METHOD MODELING THE CONSISTENCY GENERATED IN VIVO BY FOOD DURING THE DIGESTION THEREOF

(75) Inventors: Pierre Aymard, Antony (FR); Robin Wahl, Igny (FR)

(73) Assignee: Generale Biscuit, Rungis (FR)

( * ) Notice: Subject to any disclaimer, the term of this patent is extended or adjusted under 35 U.S.C. 154(b) by 372 days.

(21) Appl. No.: 12/582,404

(22) Filed: Oct. 20, 2009

(65) Prior Publication Data
US 2010/0105023 A1    Apr. 29, 2010

(30) Foreign Application Priority Data

Oct. 20, 2008   (FR) ...................... 08 57128

(51) Int. Cl.
*G05D 7/00*   (2006.01)
(52) U.S. Cl. ........................ 422/111; 366/133
(58) Field of Classification Search .................. 422/111; 366/133
See application file for complete search history.

(56) References Cited

U.S. PATENT DOCUMENTS

| 5,525,305 | A | * | 6/1996 | Minekus et al. | ............... | 422/111 |
| 8,092,222 | B2 | * | 1/2012 | Wickham et al. | ............... | 434/127 |
| 2007/0037276 | A1 | | 2/2007 | De Crecy | | |

FOREIGN PATENT DOCUMENTS

| DE | 40 42 298 A1 | 7/1992 |
| WO | 98/51236 A1 | 11/1998 |
| WO | 99/28437 A1 | 6/1999 |

OTHER PUBLICATIONS

Stowd L. et al. Dysphagia Dietary Guidelines . . . Chest 2008:133(6)1397-1401.*
Dikeman C. et al. Dietary Fibers Affect Viscosity of Solutions and Simulated Human Gastric and Small Intestinal Digesta. Journal of Nutrition 136:913-919, 2006.*
European Patent Office European Search Report dated Nov. 20, 2009 for European Application No. 09173554.8, 4 pages.
Caroline L. Hoad et al., "In Vivo Imaging of Intragastric Gelation and Its Effect on Satiety in Humans," The Journal of Nutrition, 2004, vol. 134, No. 9, pp. 2293-2300.
C. A. Edwards et al., "Viscosity of food gums determined in vitro related to their hypoglycemic actions," The American Journal of Clinical Nutrition, 1987, vol. 7, pp. 72-77.
James F. Steffe, Rheological Methods in Food Process Engineering, Second Edition, Freeman Press, East Lansing, Michigan, 1992, 428 pages.
A. Ait-Kadi et al., "Quantitative Analysis of Mixer-Type Rheometers Using Couette Analogy," Canadian Journal of Chemical Engineering, 2002, vol. 80, No. 6, pp. 1166-1174.
Klaus N. Englyst et al., "Starch Analysis," Encyclopedia of Analytical Chemistry, John Wiley & Sons Ltd, 2000, pp. 4246-4262.

* cited by examiner

*Primary Examiner* — Ralph Gitomer
(74) *Attorney, Agent, or Firm* — Fitch, Even, Tabin & Flannery, LLP (57) ABSTRACT

The present invention relates to an in vitro method modeling and measuring the consistency generated in vivo by a food during the digestion thereof. The method includes the steps of grinding the food to reproduce the mechanical breakdown performed during chewing, mixing under stirring of the ground food with a solution modeling gastric fluid in a reactor vessel coupled with a rheometer for a time corresponding to gastric digestion, and adjustment under stirring of the reaction mixture to model intestinal digestion conditions for a time corresponding to intestinal digestion, wherein the rheometer is provided with a stirrer used to homogenize the mixture and measure the viscosity and/or the viscoelasticity thereof.

17 Claims, 8 Drawing Sheets

IN VITRO METHOD MODELING THE CONSISTENCY GENERATED IN VIVO BY FOOD DURING THE DIGESTION THEREOF

This application claims priority to France 08 57128 filed Oct. 20, 2008.

The present invention relates to an in vitro measurement method of the consistency generated by a food in the stomach and small intestine.

Digestion is a complex mechanism, which starts with the mechanical and chemical breakdown of nutrients in the mouth. Saliva contains enzymes which start digestion, agents preventing bacterial proliferation and lubricating foods to facilitate swallowing. Chewed food moves down to the stomach by means of esophageal peristaltic movement (rhythmic contractions).

In the stomach, which can contain up to approximately two liters of food, foods are mixed with gastric secretions containing hydrochloric acid and proteolytic enzymes such as pepsin, which continue the breakdown process.

The stomach contents, referred to as acidic chyme, are evacuated according to sigmoid kinetics, into the small intestine, where the pH increases to values close to neutrality. Over 6 meters long, the small intestine is the main digestive organ and carries out the greatest proportion of nutrient uptake in the blood circulation. The chyme or bolus subsequently transits to the large intestine.

Increasing the consistency of the bolus in the gastric tract is liable to slow down gastric evacuation and increase the diffusion time of nutrients in the intestine which would contribute to the sensation of satiety. For example, it has been demonstrated that increasing the consistency of the food bolus, thickened or gelled by means of texturing fibers induces gastric distension, thus generating a sensation of satiety (Oad C L, Rayment P., Spiller R C, Marciani L., de Celis Alonso B., Traynor C., Mela D J., Peters H. P. F. and Gowland P. A., 2004): In vivo imaging of intragastric gelation and its effect on satiety in humans. J. Nutr: 2293-2300). In the intestine, it has been demonstrated that modifying the consistency of the chyme prolongs the diffusion of nutrients and particularly reduces the postprandial rate of glucose appearance, inducing a limitation in the blood glucose and blood insulin peak. A relationship between increasing the viscosity, for example of a fiber-enriched drink, and the reduction in postprandial blood glucose and blood insulin was demonstrated by Edwards et al in 1987 (Edwards C. A., Craigen L., Davison P., Tomlin J., Sugden K., Johnson I. T. and Read. W., Viscosity of food gums determined in vitro related to their hypoglycaemic actions. Am J Clin Nutr; 7).

Therefore, it appears that controlling food bolus consistency during digestion influences the glycemic and/or insulinemic response, and makes it possible to prolong the sensation of satiety, i.e. delaying the onset of the sensation of hunger.

For food products intended to decrease the glycemic or insulinemic response and/or prolong the sensation of satiety, it is therefore essential to know the variation of the food bolus consistency during the first stages of digestion (gastric and intestinal). It is also important to ensure, prior to any marketing, that the increase in consistency generated by the food or the particle size of the food does not increase excessively in the gastrointestinal tract, which would also induce potential occlusion risks for the consumer.

Food bolus viscosity measurements during digestion are made in vivo by means of tubes inserted by the nasal routes and lowered into the stomach. These methods are, on one hand, very uncomfortable for the subject and also do not make it possible to measure the variation of the viscosity of the bolus beyond the stomach, in the intestine in particular, which represents, however, a major stage of digestion. Another in vivo method consists of introducing tracers in nutrients to monitor the digestion rate thereof. These tracers give an overall digestion rate between intake by the mouth and defecation, but do not give an indication of the viscosity of the food bolus in the stomach and in the intestine. In addition, these in vivo methods quickly become tedious and costly when the results thereof need to be validated on a panel of several dozen subjects in order to be representative.

Some extremely complex in vitro models have been developed, such as for example a model based on a dynamic and multi-compartmentalized system (stomach, duodenum, jejunum and ileum) controlled and monitored continuously by computer, described in U.S. Pat. No. 5,525,305 filed by Nederlandse Organisatie voor Toegepast-Natuurwetenschappelijk Orderzoek TNO. This method reproduces under the most physiological conditions possible, in terms of time and pH conditions in particular, the peristaltic movements, digestive enzyme secretions, intestinal transit and uptake of digestion products and makes it possible to give information on the chemical outcome of foods during digestion (for example, sugar appearance rate) or on the survival of some constituents (such as probiotic bacteria) in the gastrointestinal tract.

However, this dynamic and multi-compartmentalized device does not include the determination of food bolus viscosity. Therefore, it is necessary to take occasional samples and make a remote measurement on a viscometer or rheometer. However, sampling in this type of system disturbs the simulation of the digestion process, generating a variation in volume which may be significant with respect to the circulating volume or disturb pH regulation. In addition, the presence of large particles in the food poses rheological measurement problems, the viscometers operating with a narrow gap (between 50 microns and 0.5 cm) that is not suitable for macroscopic particles.

Consequently, such a method is not only difficult and costly to use, but it cannot be used to measure gastric and intestinal viscosity continuously, which is necessary to anticipate the in vivo effects of some ingested nutrients, particularly non-digestible polysaccharides, on glycemic and insulinemic responses and on satiety.

Therefore, there is a need for a simple and reproducible in vitro method to predict the variation of the consistency of the food bolus during the main phases of digestion, and which is representative of in vivo physiological conditions.

Therefore, the present invention proposes an in vitro continuous measurement model of the variation of the consistency generated by a food in the stomach and the small intestine.

In fact, known methods for the measurement of viscosity of a fluid mixture, i.e. flowing under its own weight, require stirring to be stopped to measure the viscosity so as, on one hand, not to disturb the viscosity measurement and, on the other, to prevent any shock between the viscosity measurement device and the stirrer, these two devices being frequently fragile and/or costly. Therefore, it is not possible, on the basis of known viscosity measurement devices, to measure the variation of the viscosity of a mixture, for example by adding new compounds or modifying the operating conditions, continuously without interrupting the stirring of said mixture. Only a succession of individual viscosity measurements may be obtained, inducing a shift between the variation of the actual viscosity of the mixture and the variation of the viscosity measured in vitro. In addition, in the case of a two-phase mixture, such as partially hydrophilic solid particles dispersed in a liquid, and wherein the solubilization is progressive, it is not possible to measure the viscosity from the first stages of the digestion process in that the mixture is too heterogeneous and the sample not representative. Therefore, it is necessary to wait for the mixture to obtain a relatively homogeneous consistency in order to take a sample, which does not make it possible to monitor the entire kinetics but only to characterize the final phase.

Therefore the invention relates, in a first embodiment, to an in vitro method modeling and measuring the variation of the consistency generated in vivo by a food during the digestion thereof, comprising the following steps:

a. Grinding of the food to reproduce the mechanical breakdown performed during chewing, b. Mixing under stirring of the ground food with a solution modeling gastric fluid in a reactor vessel coupled with a rheometer, for a time corresponding to gastric digestion, c. Adjustment under stirring of the reaction mixture to model intestinal digestion conditions for a time corresponding to intestinal digestion, the rheometer being provided with a stirrer used to homogenize the mixture and measure the viscosity and/or the viscoelasticity thereof.

When the viscosity of the mixture is measured, the rheometer homogenizes the mixture and measures the viscosity thereof simultaneously.

When the viscoelasticity of the mixture is measured, the rheometer homogenizes the mixture and measures the viscoelasticity thereof consecutively.

The term "simultaneously" means, according to the present application, that the stirrer is used for both the viscosity and/or viscoelasticity measurement and stirring and conducts both operations at the same time.

The term "consecutively" means, according to the present application, that the stirrer is first used for stirring, and then for measuring the viscoelasticity.

The term "food" means, according to the present application, a food ingredient alone or any food product including a plurality of food ingredients.

In particular, the invention relates to an in vitro method modeling and measuring the consistency generated in vivo by a food during the digestion thereof, comprising the following steps:

a. Grinding of the food until particles of an average size between 5 µm and 3000 µm are obtained;

b. Preparation of a solution modeling gastric fluid comprising water maintained at an acidic pH between 1 and 4 and a proteolytic enzyme for example such as pepsin, said enzyme being present at a concentration ranging from 0.025 to 2.5% by weight of the gastric fluid solution;

c. Mixing under stirring of the food obtained in a. with the solution obtained in b. in a reactor vessel coupled with a rheometer, for a time between 30 minutes and 4 hours, said reactor between maintained at a temperature between 35 and 40° C., preferentially between 36 and 38° C.;

d. Adjustment of the pH in the reactor to a value between 5 and 7.5 and addition of 0.03 to 3% by weight of bile salts and of 0.04 to 4% by weight of pancreatin, these percentages being expressed by weight with respect to the weight of the mixture contained in the reactor vessel, and maintenance of the mixture under stirring for a time ranging from 1 to 8 hours, preferentially from 1 to 4 hours, the rheometer is equipped with a stirrer used to homogenize the mixture and measure the viscosity and/or viscoelasticity thereof.

The term consistency generated "in vivo" by a food during the digestion thereof refers, according to the present application, to the consistency generated by a food during the digestion thereof in a monogastric mammal, and preferentially in humans. If the food is fluid, the consistency is evaluated by means of a viscosity and/or viscoelasticity measurement. If the food is viscoelastic, the consistency is evaluated by means of viscoelasticity measurement.

The water used in the present invention can in particular be deionized water. To more reliably reproduce the physiological conditions, it is optionally possible to add various salts usually present in physiological fluids such as sodium chloride to the water.

Bolus Consistency Variation Monitoring

The method according to the present invention enables continuous in vitro measurement modeling and measuring the consistency generated in vivo by a food during the digestion thereof, particularly during the passage in the stomach and the small intestine.

If the food bolus remains fluid overall during the gastrointestinal phases, the method according to the invention makes it possible to measure the variation of the viscosity over time, at constant shearing rate and temperature. Viscosity is defined as the flow resistance of a fluid.

In a steady shear flow state, the viscosity (in Pa·s) is defined as the ratio between the shear stress (in Pa) and the shear rate (in $s^{-1}$):

Shear viscosity=shear stress/shear rate

Simple fluids consisting of small molecules or dilute macromolecule solutions have a so-called Newtonian behavior, i.e. the viscosity is only dependent on the temperature.

More complex, or non-Newtonian, fluids also see their viscosity vary as a function of the shear rate and/or measurement time. It is no longer possible to simply defines a single viscosity value (at a given temperature), but the term "apparent viscosity", depending on the measurement conditions, is used. In this case, to determine the behavior of such a fluid, it is necessary to produce a flow curve, i.e. measure the viscosity at different shear rates; this is possible within the scope of the invention.

In the event of the food containing constituents inducing texturing of the food bolus, for example functional gelling agents under gastrointestinal conditions—i.e. compounds developing gelling properties when they are under temperature, pH and salinity conditions of the gastrointestinal tract—measuring the viscosity by means of shearing tends to break the structure being formed. In this case, a specific embodiment consists of substituting the stirring in the gastric or intestinal phase, used to measure the viscosity, by very low strain oscillatory measurements, making it possible to allow the bolus to be structured practically at rest. Such measurements are known to enable the determination the viscoelastic moduli G' (elastic modulus, relating to the solid part) and G" (viscous modulus, relating to the fluid part), as described in particular in the publication of Steffe, J. F, 1992, Rheological Methods in Food Process Engineering, Second Edition, Freeman Press, USA.

In practice, the strain that can be applied is between 0.01% and 1%, preferentially 0.1%, with a frequency of 0.01 Hz to 10 Hz, preferentially around 1 Hz.

Therefore, the blade (or stirrer) operates very low amplitude oscillatory movements, which do not disturb the structuring of the food bolus. In this way, it is possible to monitor gelling taking place in the bolus, for example initiated by ionic interactions between charged polymer chains (polysaccharides or proteins) and specific salts.

If gelling takes place in the gastric phase, the in vitro method according to the invention modeling and measuring the consistency generated in vivo by a food during the digestion thereof, comprises the following steps:

a. Grinding of the food until particles of an average size between 5 μm and 3 mm are obtained;

b. Preparation of a solution modeling gastric fluid comprising water maintained at an acidic pH between 1 and 4 and a proteolytic enzyme for example such as pepsin, said enzyme being present at a concentration ranging from 0.025 to 2.5% by weight of the gastric fluid solution;

c. Mixing of the food obtained in a. with the solution obtained in b. in a reactor vessel until a homogeneous mixture is obtained, d. Measurement of viscoelasticity of the mixture, for a time ranging from 30 minutes to 8 hours, said reactor being maintained at a temperature between 36 and 38° C.;

the device used to measure the viscoelasticity of the mixture producing a sinusoidal strain between 0.01% and 1%, preferentially 0.1%, and a frequency between 0.01 Hz to 10 Hz, preferentially around 1 Hz.

In the event of gelling in the gastric phase, resulting in a solid viscoelastic mixture, the test cannot be continued under intestinal conditions, the mixing phase necessary to obtain intestinal conditions being rendered impossible by the solid viscoelastic structure of the gastric bolus.

If gelling takes place in the intestinal phase, the in vitro method according to the invention modeling and measuring the consistency generated in vivo by a food during the digestion thereof, comprises the following steps:

a. Grinding of the food until particles of an average size between 5 μm and 3 mm are obtained;

b. Preparation of a solution modeling gastric fluid comprising water maintained at an acidic pH between 1 and 4 and a proteolytic enzyme for example such as pepsin, said enzyme being present at a concentration ranging from 0.025 to 2.5% by weight of the gastric fluid solution;

c. Mixing under stirring of the food obtained in a. with the solution obtained in b. in a reactor vessel coupled with a viscosity measurement device, for a time ranging from 30 minutes to 4 hours, said reactor between maintained at a temperature between 36 and 38° C.;

d. Adjustment of the pH in the reactor to a value between 5 and 7.5 and addition of 0.03 to 3% by weight of bile salts and of 0.04 to 4% by weight of pancreatin, these percentages being expressed by weight with respect to the weight of the mixture contained in a reactor vessel, and maintenance of the mixture under stirring until a homogeneous mixture is obtained;

e. Measurement of the viscoelasticity of the mixture, for a period of 30 minutes to 8 hours, in which said reactor is kept at a temperature between 36° C. and 38° C.

the device used to measure the viscosity in step c being provided with a stirrer used to homogenize the mixture and measure the viscosity thereof simultaneously, and to measure the viscoelasticity in step e producing a sinusoidal strain between 0.01% and 1%, preferentially 0.1%, and a frequency between 0.01 Hz to 10 Hz, preferentially around 1 Hz.

To complete the present method, in the event of viscosity monitoring, it is beneficial to produce flow curves of the food bolus in the gastric and intestinal phases which will make it possible to evaluate the fluid, shear-thinning or potentially thixotropic behavior of the food bolus.

These flow curves are well known to those skilled in the art.

The shear rate (or stress) is progressively increased (with a linear or logarithmic interval) and the corresponding viscosity is measured. The rate or stress is then progressively decreased and the viscosity is measured. The viscosity curve obtained as a function of the rate is referred to as a rheogram. A "flat" rheogram, with a constant viscosity, indicates that the fluid is Newtonian.

A decrease in the viscosity with the shear rate indicates a shear-thinning behavior, frequently associated with chain orientation and, in the case of polymeric compounds, disentanglement in the shear field. A significant drop in viscosity of up to two or three orders of magnitude may thus be observed by progressively increasing the shear rate.

An increase in viscosity with the shear rate may indicate a shear-thickening behavior that may be associated with the existence of aggregation or blocking of the flow applied in the shear field, or departure from the laminar flow state resulting in the formation of local turbulences, which increase the apparent viscosity value.

The thixotropic behavior is in turn evaluated by comparing the "upward" flow curve and the "downward" flow curve. A significant shift between the two outward and return curves indicates the presence of partial structuring of the initial fluid, which is eradicated, often reversibly, by the shearing observed.

According to a preferred embodiment, the device used to measure the apparent viscosity or viscoelasticity of the mixture is an MCR300, MCR301 and MCR500 air bearing type high-performance rheometer, marketed by Anton Paar-Physica.

The rheometer is equipped with a stirrer (or probe, or blade) having a geometry enabling the homogenization of the mixture in which it is introduced.

In particular, the stirrer may come in the form of a spiral or anchor to prevent the sedimentation or, on the other hand, creaming of large particles in the mixture, such that the medium is as homogeneous as possible. Examples of stirrers are in particular those marketed by the Anton Paar GmbH company, under references ST 24-2HR-37/120; ST 24-2HR-37/106; ST 39-2HR-50/152; ST 60-2HR-90/188.5 (Anton Paar, Accessory Catalog 2009). Preferably, the stirrer that can be used in this invention is ST 60-2HR-90/188.5.

The stirrer may particularly be calibrated using the procedure by Alt et al (Ait-Kadi, A., Marchal, Ph., Choplin, L., Chrissemant, A. S. and Bousmina, M. L, 2002, Canadian Journal of Chemical Engineering, vol 80, 6, 1166-1174).

The principle of this calibration consists of evaluating for each stirrer the constants, K tau (linking the shear stress and the resistive torque) and K gamma (linking the shear rate and the rotation speed).

This evaluation is performed using Newtonian or shear-thinning model fluids, wherein the rheological parameters are measured on a viscometer or rheometer equipped with a conventional coaxial cylinder type geometry. The analogy between the measurements made on the model fluid with the conventional geometry and the new stirrer makes it possible to determine the two constants K tau and K gamma with an uncertainty of the order of 10%. These constants are then inserted in the rheometer software, which may then be controlled using the shear rate or stress, in accordance with normal operation.

According to a preferred embodiment, the rheometer has a maximum torque at least equal to 150 mNm and a minimum torque less than or equal to 0.25 microNm.

The rheometer may in particularly with coupled with a computer equipped with a US 200 data acquisition program, said program being used to:

operate the rheometer in an automated manner, i.e. the various stirring events (at a defined speed and for a given time) mentioned above do not require operator intervention save all the data so as to perform a complete off-line analysis.

The addition of water, acid or base to adjust the pH in the different steps of the process, and enzymes necessary for reproduction of the gastric and intestinal fluids can be performed manually or automatically by a titration station.

When added manually, the enzymes can be added in the form of powder (which then dissolves in the contents of the vessel) or in the form of solutions prepared beforehand by precisely weighing the powders (enzymes, salts and possibly bile salts) and by dispersing them at room temperature under gentle stirring in the desired amount of deionized water (also precisely weighed) in order to obtain the desired enzyme concentrations. To minimize the dilution of the modeled gastric phase, the gastric enzyme solutions preferably include an enzyme content between 10% and 50% by weight with respect to the weight of said solution. To minimize the dilution of the modeled intestinal phase, the intestinal enzyme solutions preferably include an enzyme content between 10% and 30% by weight with respect to the weight of said solution.

When added automatically, the added elements (water, acid, base, enzymes) are preferably in the form of solutions prepared beforehand. In this case, the assaying of the amounts of added elements is performed using a titration station, which enables the pH to be adjusted automatically and the value thereof to be recorded for the entire experiment.

According to a preferred embodiment, the stirrer used to homogenize the mixture and measure the viscosity thereof simultaneously consists of at least one helical blade (1) rotated about a vertical shaft (2), corresponding to that of a reactor vessel and a support bar (3) and perpendicular to the shaft, located at the lower end of said shaft.

The term helical means that the blade has the shape for example of a spiral staircase and not the shape of a curve which starts at a central point and subsequently moves further and further away, while rotating around same.

Figure 1:
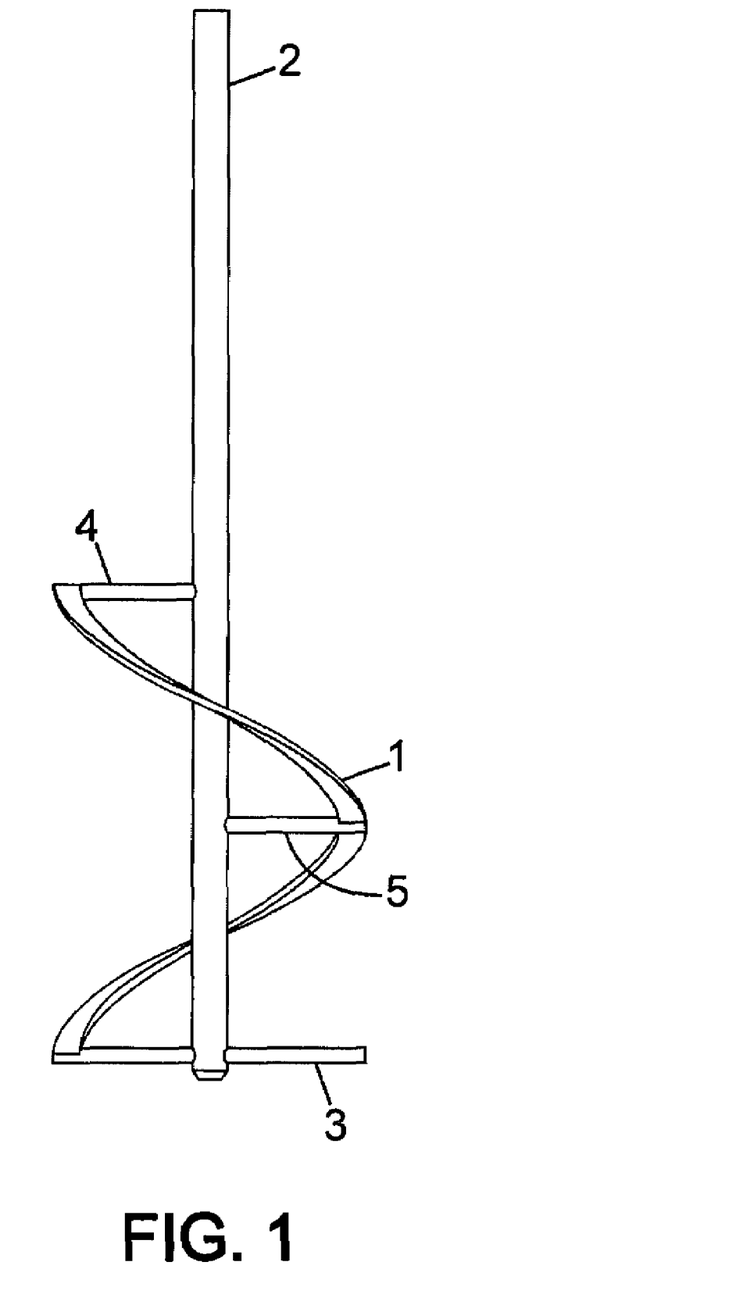
FIGS. 1, 2 and 3 represent stirrers according to the invention comprising one or two helical blades, in a side view.
Figure 2:
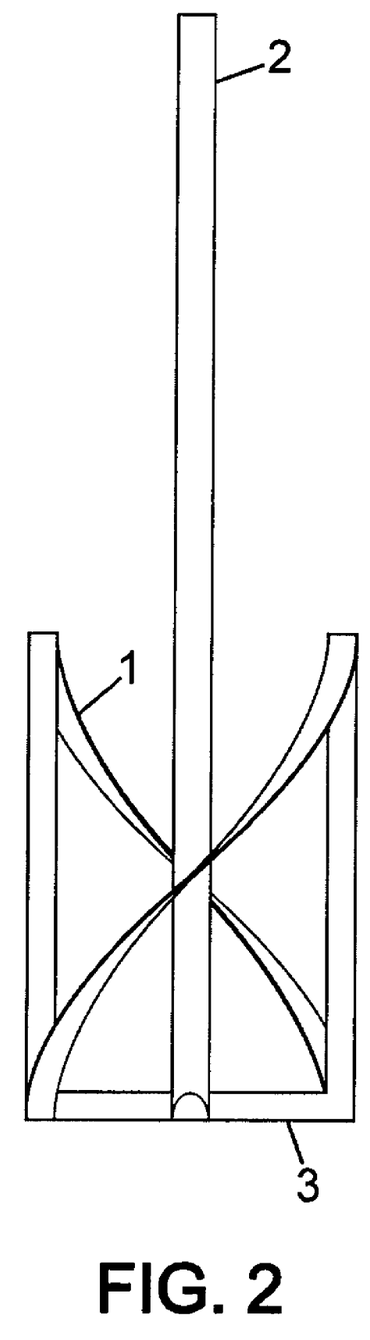

According to a preferred embodiment illustrated in FIGS. 1 and 2, the stirrer comprises at least two coaxial helical blades, arranged symmetrically with respect to the vertical shaft. In particular, the stirrer may comprise between 2 and 6 helical blades, for example 2, 3 or 4 blades.

The helical blade or each of the helical blades may comprise between one half (FIG. 2)—i.e. 180° rotation—and several spiral pitches or turns, for example two or three pitches, preferentially 1 pitch (FIGS. 1 and 3)—360° rotation. Increasing the number of spiral pitches forming the stirrer may particularly make it possible to increase the shearing of the mixture and/or the suitability for pumping of the geometry of the stirring, which may be particularly useful if the mixture is viscous and/or has a high particle concentration.

Figure 3:
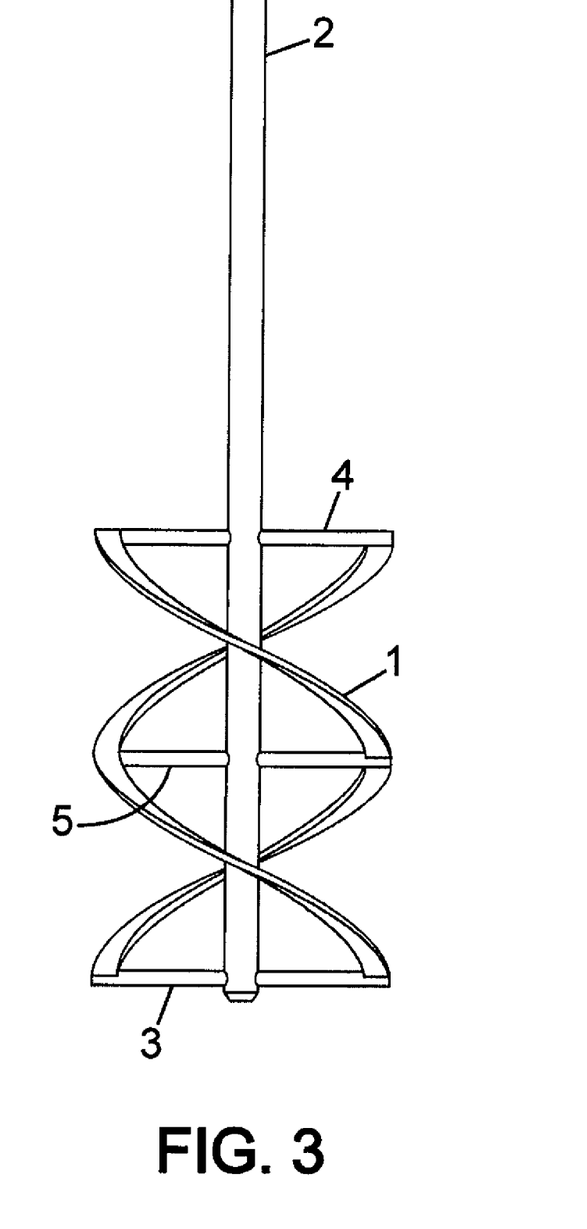

A helical blade (1) may consist of flat (as represented in FIGS. 1 to 3), curved or semi-helical rods, or circular rods. In particular, the rods forming the blade may be made of metal, and have, in combination, with this feature or not, a thickness between 1 and 3 mm and a width between 2 and 8 mm.

According to a preferred embodiment, a helical blade (1) is not in contact with the vertical shaft, which enables the reaction mixture to circulate between the shaft and the blade.

When it is rotated, a helical blade creates a suction which tends to displace the reaction mixture to the top of the reactor vessel (or vertical pumping of the reaction mixture), which improves the efficiency of mixing, particularly when powder (ground food, enzyme) or liquid (concentrated acid and base) are dispersed in water.

The lower end of the helical blade is attached to the radial support bar (3), and particularly to one of the ends of the radial support bar.

To reinforce the structure of the stirrer, the upper end of the blade(s) (1) may be attached to a second radial bar (4), parallel with the radial support bar (3).

In particular, when the stirrer comprises two coaxial helical blades (FIG. 2 or 3), symmetric with respect to the vertical shaft (2), said blades (1) are connected together at the lower end thereof by the support bar (3). In the device of FIG. 3, the blades are also connected at the upper end thereof by the second radial bar (4), parallel with the support bar.

The thickness of these support bars may be between 1 mm and 3 mm.

According to a specific embodiment, the stirrer comprises two coaxial helical blades (FIG. 3), symmetric with respect to the vertical shaft (2), forming a spiral turn, connected together at the lower end thereof by the support bar (3), at the upper end thereof by the second radial bar (4), parallel with the support bar (3), and at the level of a half-turn, by a third bar (5) parallel with the support bar.

The entire geometry may preferentially be made of stainless steel to resist the modeled conditions, and resist deformation in the case of viscous fluids. More preferentially, the geometry is produced using welds and advantageously has flush welds, so as not to generate turbulence locally which would vitiate the viscosity measurement.

The vertical shaft (2) may particularly be cylindrical, and have a diameter between 5 and 9 mm.

The radial support bar (3) may consist of flat, curved or semi-helical blades, or circular rods. This radial support bar makes it possible, when rotated, to prevent sedimentation of the reaction mixture.

Preferentially, the helical blade(s) extend(s) on substantially the entire height and/or diameter of the reaction containment for which it is intended. Similarly, the radial support bar extends on substantially the entire diameter of the containment.

The rigidity of the blade (or stirrer) is high so as not to generate viscosity measurement artefacts. In particular, the volume occupied by the blade(s) (corresponding to the volume of the cylinder circumscribed by the blade) represents 30 to 70% of the volume of the vessel, preferentially from 35 to 60%, more preferentially from 35 to 50% and even more preferentially of the order of 40%.

In particular, the volume occupied by the blade(s) (corresponding to the volume of the cylinder circumscribed by the blade) represents 30 to 80% of the volume of the mixture, preferentially from 40 to 70%, more preferentially from 50 to 65% and even more preferentially approximately 60%.

Similarly, the radial support bar occupies substantially the entire diameter of the containment for which it is intended, and preferentially between 70 and 95% of the diameter of the vessel, more preferentially approximately 85% of the diameter of the vessel.

The radial support bar may consist of flat, curved or semi-helical blades, or circular rods. This radial support bar makes it possible, when rotated, to prevent the sedimentation of the reaction mixture.

According to a preferred embodiment, the mixture according to the invention is fluid, i.e. flows under its own weight, and particularly displays a fluid to viscous texture.

The vessel can also have a double jacket so as to control the temperature of the mixture and avoid any heating, in particular in strong stirring phases or flow curves. Preferably, each vessel may also be transparent, so as to enable the mixture to be viewed and photographs or films to be made. According to a preferred embodiment, the vessel may be a double-jacketed glass vessel, called a tempering unit, as proposed by the Bercauverre, Finemech (reference type T or TGL) or Cole Parmer (reference WU-03773-20) companies. A person skilled in the art will adjust the size of the vessel to the size of the blade used so as to minimize "dead" fluid volumes (i.e. volumes that cannot be reached by the blade and that are not subjected to stirring) while avoiding overflow of the vessel.

Gastric and Intestinal Digestion Stage Modeling

The method according to the invention proposes an in vitro continuous measurement model of the consistency generated by a food during the gastric and intestinal digestion stages.

For this, it is necessary to reproduce mechanical digestion in the mouth, gastric fluid and intestinal conditions.

Reproduction of Mechanical Breakdown Performed During Chewing

The mechanical breakdown that takes place in the mouth may be reproduced by grinding the food prior to any viscosity measurement.

The ground product may be mixed with water or with a solution modeling saliva to approximate in vivo conditions as much as possible.

However, mixing with an aqueous solution may generate a compact paste that is difficult to disperse during the modeling of the subsequent digestion phases. This is particularly the case of dry or low-moisture solid products comprising constituents with a high water retention capacity, such as viscous fibers. For these foods, dry grinding is preferred.

In the case of dry foods, i.e. having a water content less than or equal to 5% by weight, with respect to the total weight of the formulation, grinding particularly makes it possible to obtain a food in particle form having a size of at least 5 μm, preferentially between 5 μm and 3000 μm, with a median ranging preferentially from 200 to 800 μm, and more preferentially approximately 500 μm.

Such grinding may particularly be performed by means of a household mini-chopper for example sold under the reference Rondo 500 by SEB.

In the case of "wet" foods, i.e. having a water content greater than 5% by weight with respect to the total weight of the formulation, modeling of mechanical digestion in the mouth may also be obtained by grinding the food. The particles obtained are coarser than those resulting from the grinding of dry foods, and may particularly have a size of at least 5 μm preferentially ranging from 500 to 2000 μm, preferentially ranging from 700 to 1500 μm, and more preferentially of the order of 1000 μm.

Finally, in the case of fluid foods such as drinks, the grinding step is unnecessary and is not performed.

As an indication, the dry or wet food may represent between 50 and 200 g for a gastric phase volume ranging from 250 to 400 ml. Similarly, ingredients or raw materials in powder form can be analyzed with this device, in which case the amounts are on the order of 1 to 200 g of powder for a gastric phase volume of 250 mL to 450 mL. Those skilled in the art will adjust these values so that the food can be dispersed in gastric fluid, without however making the reactor overflow during stirring.

According to a preferred embodiment, the method according to the invention makes it possible to model, in vitro, the consistency generated in vivo by a dry food during the digestion thereof.

Gastric Digestion Modeling

Gastric digestion is modeled by adding a solution displaying a similar composition to gastric fluid.

Gastric fluid (or gastric juice) secreted by the stomach contains agents such as hydrochloric acid, salts such as sodium chloride and some enzymes, such as pepsin which lyases proteins.

Formulations modeling gastric fluid are known in the prior art. The same applies to intestinal digestion conditions. As an illustration, gastric and intestinal model fluids have been described by Englyst K. N., Hudson G. J., Englyst H. N., 2000, Encyclopedia of Analytical Chemistry, Meyers R. A. Chichester: John Wiley & Sons Ltd, 2000: 4246-4262.

Such models are extremely precise and may prove to be tedious to implement, particularly due to the quantity of enzymes to be used in the intestine.

Those skilled in the art will select mechanical digestion models of the mouth, and gastric or intestinal conditions suited to the desired degree of correlation between the in vitro model and the in vivo results and the impact thereof on the viscosity and/or viscoelasticity measurement.

The applicant succeeded in identifying simplified gastric or intestinal condition models, making it possible to anticipate the variation of the consistency of a food during gastric and intestinal digestion phases, which is easy and quick to implement.

In particular, the simplified gastric or intestinal condition models identified, correlated with the continuous monitoring method of the variation of consistency according to the present invention, make it possible, in approximately 4 hours, to provide the rheological behavior of any food during in vivo digestion. In addition, this method may be automated to a large extent or completely (including the introduction of acids, bases, or enzymes), and enables a simple start-up, without human intervention.

According to a preferred embodiment, the device for automating the modeling of gastric and intestinal conditions is a double-buret Titralab 856 titration station associated with one (or more) ABU52 double buret and a peristaltic pump, equipment available from the Radiometer Analytical SAS company. This equipment in particular enables automatic control of 1 to 6 burets, as well as feedback control of the peristaltic pump used to assay the enzyme suspension comprised of pancreatin and bile salts.

Preferably, the automatic modeling of the gastric fluid is performed using 3 burets, the first directly assaying, in the vessel, the exact amount of deionized water necessary (possibly containing a mixture of salts), the second adding the amount of acid necessary to reach the target pH value and the third assaying a concentrated pepsin solution. Said solution can be buffered at a pH between 1 and 4, preferably around 2 and can include a pepsin content ranging from 10 to 50% by weight with respect to the weight of said solution. The maintenance of an acid pH enables the enzymatic activity of the pepsin to be maintained (which is irreversibly denatured beyond a pH on the order of 6).

Advantageously, the titration station can be coupled to a computer equipped with TitraMaster85 Data Collector data acquisition software available from the Radiometer Analytical SAS company. This software enables solutions modeling gastric and intestinal fluids to be prepared, as well as the pH value of the bolus to be controlled and recorded during the entire artificial digestion period so as to perform a complete and differed analysis thereof.

Figure 12:
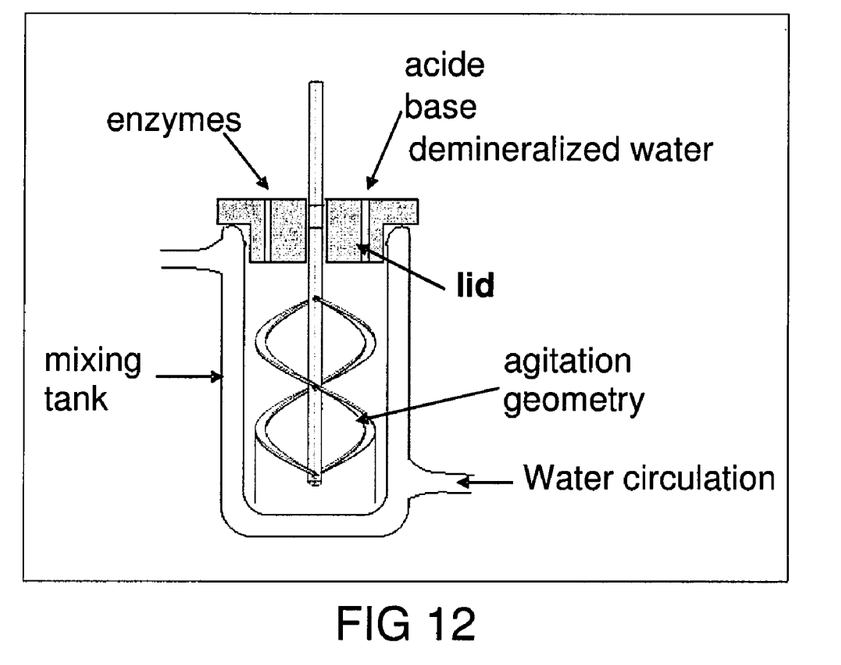
FIGS. 12 and 13 respectively represent a frontal view and a top view of a vessel lid with holes to accommodate various probes.
Figure 13:
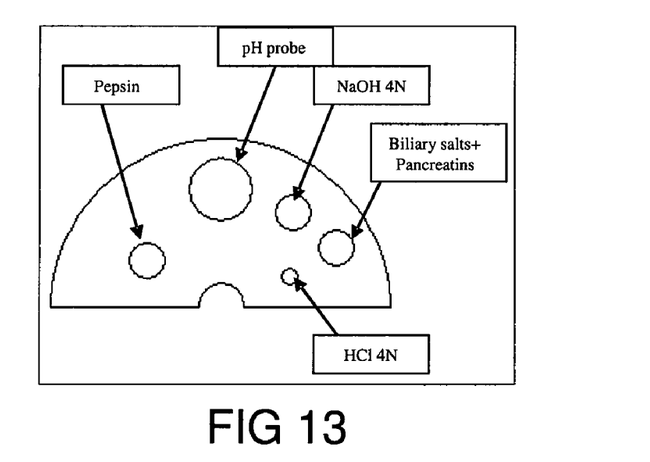

Preferably, the points—i.e. the ends of the tubes used to transfer the buret container to the mixing tank—at which the acid, base, water, enzymes and pH probe are added can be held above the vessel by a plastic lid, with holes so as to accommodate these various proves as shown in FIGS. 12 and 13. Said lid can also limit evaporation of the bolus, which would increase the dry extract and falsify the viscosity value thereof.

Gastric conditions may be modeled using a solution comprising water maintained at an acidic pH between 1 and 4 and a proteolytic enzyme for example of the pepsin type, said enzyme being present at a concentration ranging from 0.025 to 2.5% by weight, with respect to the total weight of the solution.

Pepsin breaks down the proteins of the food bolus by hydrolyzing aromatic amino acid peptide bonds.

The pepsin that may be used according to the invention may be a porcine pepsin such as P7000 pepsin marketed by Sigma Aldrich.

According to a preferred embodiment, the proteolytic enzyme, for example pepsin, is present at a concentration ranging from 0.025 to 2.5% by weight, with respect to the total weight of the solution, preferentially from 0.1 to 1.5% by weight, and more preferentially approximately 0.25% by weight.

The water used to model gastric conditions is preferentially deionized water, to which between 0.2 and 20 mg/mL of sodium chloride, and preferably 2 mg/mL is added. It is maintained at an acidic pH between 1 and 4. The acidification of the solution may particularly be obtained by adding acidic solutions.

According to a preferred embodiment of the invention, water is kept acidic by adding a concentrated hydrochloric solution, particularly having a molar concentration of the order of 4N so as to minimize the variation of the volume of the gastric model fluid.

In particular, the volume occupied by the mixture may represent between 60 and 90% of the reactor vessel volume, preferentially between 70 and 80%, and more preferentially of the order of 75% of the reactor vessel volume. The volume of the mixture is equivalent to the sum of the fluid part and the dry or wet integrated part.

The modeling of gastric digestion involves mixing of the ground food obtained to reproduce the mechanical digestion in the mouth, with the simplified gastric fluid described above.

The mixing may in particular be performed at a shear rate between $10 \text{ s}^{-1}$ and $1000 \text{ s}^{-1}$, and preferentially between 50 and $300 \text{ s}^{-1}$.

As explained above, in the case of a two-phase mixture, such as the dispersion of partially hydrophilic solid particles in a fluid, and wherein the solubilization is progressive, it is not possible to measure the viscosity from the first stages of the digestion process in that the mixture is too heterogeneous and the sample not representative.

It may be preferable, according to a specific embodiment, to increase the stirring speed substantially during the modeling of a new digestion phase (corresponding to the addition of enzyme, acid or base), for a short time to accelerate the homogenization of the mixture.

In particular, the modeling of the gastric digestion stage comprises the following steps:

a. Preparation of a solution modeling gastric fluid comprising water maintained at an acidic pH between 1 and 4 and a proteolytic enzyme for example of the pepsin type, said enzyme being present at a concentration ranging from 0.025 to 2.5% by weight, with respect to the total weight of the gastric fluid solution;

b. Optional grinding of the food;

c. Mixing under vigorous stirring, for example between 50 and $300 \text{ s}^{-1}$, of the food ground if applicable in b. in a reactor vessel coupled with a rheometer, for a time ranging from 2 to 30 minutes, said reactor between maintained at a temperature between 35 and 40° C., followed by adjustment of the pH to the target value between 1 and 4;

d. Mixing under stirring, for example between 1 and 100 $\text{s}^{-1}$, in a reactor vessel coupled with a rheometer, for a time between 30 minutes and 4 hours, at a temperature between 36° C. and 38° C.

In particular, the mixing may be performed in a reaction containment (referred to as a reactor), preferentially thermostatically controlled to maintain the gastric medium at a temperature between 35 and 40° C., preferentially between 36 and 39° C., and more preferentially between 36 and 38° C., representative of the in vivo stomach temperature in a monogastric mammal, preferentially humans.

The pH is maintained between 1 and 4, and preferentially approximately 2.

The gastric digestion modeling time may be between 30 minutes and 4 hours. However, the aim of the present invention is to propose an in vitro method that is rapid to use and is in line with the in vivo results.

To this end, the gastric digestion modeling time may be between 30 minutes and 90 minutes, and may particularly be of the order of 70 minutes.

Intestinal Digestion Modeling

Following the gastric digestion stage, the reaction containment conditions are adjusted to represent the intestinal conditions optimally by increasing the pH of the mixture to a value between 5.5 and 7 and by adding 0.03 to 3% by weight of bile salts and 0.04 to 4% by weight of pancreatin, these percentages being expressed by weight with respect to the weight of the mixture contained in a reactor vessel, and maintaining the mixture under stirring for a time ranging from 1 to 8 hours, preferably 1 to 4 hours.

In particular, the pH of the mixture is increased by adding a concentrated basic solution. The base present in the intestine in vivo is sodium bicarbonate. However, this base involves the drawback of producing a gas and therefore foaming when it is introduced into the reactor vessel, even at a low concentration and thus increases the viscosity value. Therefore, the base used preferentially according to the invention may be concentrated sodium hydroxide, for example at a molar concentration of the order of 4N so as to minimize the variation of the volume modeling intestinal fluid.

The modeling of intestinal condition involves the addition of bile salts and pancreatin.

Usually secreted by the liver and stored in the gallbladder, bile salts enable the fragmentation of large food fat globules, thus resulting in the formation of microdroplets.

The bile salts that may be used in the method according to the invention are particularly bile salts of porcine origin, such as those marketed by Sigma Aldrich under the reference B8631 Bile Extract porcine.

According to a preferred embodiment, bile salts are present at a concentration ranging from 0.03 to 3% by weight, with respect to the total weight of the solution, preferentially from 0.1 to 1.5% by weight, and more preferentially approximately 0.3% by weight.

Pancreatin is an enzyme obtained from pancreatic juice.

The pancreatin that may be used according to the invention may be a pancreatin obtained from pigs such as P7545 pancreatin marketed by Sigma Aldrich.

According to a preferred embodiment, pancreatin is present at a concentration ranging from 0.04 to 4% by weight, with respect to the total weight of the solution, preferentially from 0.1 to 1.5% by weight, and more preferentially approximately 0.25% by weight.

In particular, intestinal conditions may be modeled in the same thermostatically controlled containment as that used to model gastric conditions, to maintain the intestinal medium at a temperature between 35 and 40° C., preferentially between 36 and 39° C. and more preferentially between 36 and 38° C., representative of the in vivo temperature of the small intestine in a monogastric mammal, particularly humans.

In particular, the modeling of the intestinal digestion stage may comprise the following steps:

a. Mixing under vigorous stirring, for example 50 to 300 s$^{-1}$, for a time of 2 to 30 minutes, during which the pH is adjusted in the reactor to a value between 5 and 7.5 and 0.03 to 3% by weight of bile salts and 0.04 to 4% by weight of pancreatin are added, these percentages being expressed by weight with respect to the weight of the mixture contained in the reactor vessel;

b. Maintenance of the mixture under stirring, for example 1 to 100 s$^{-1}$, for a time ranging from 1 to 8 hours;

The pH is maintained between 5 and 7.5, and preferentially approximately 6.3.

Preferably, the modeling of the intestinal conditions is performed automatically using a titration station as described above, such as the double-buret Titralab 856 associated with an ABU52 double buret and a peristaltic pump, equipment available from the Radiometer Analytical SAS company.

Preferably, the automatic modeling of the intestinal fluid is performed using a buret assaying the amount of base to be added to the vessel in order to obtain the desired intestinal pH value, and a peristaltic pump assaying a pancreatin and bile salt solution or suspension. Said solution has a pancreatin content ranging from 10 to 30% by weight with respect to the weight of said solution. Indeed, with these pancreatin and bile salt contents, a relatively viscous suspension is obtained, which is impossible to assay precisely by a conventional buret. A peristaltic pump is therefore necessary to be capable of precisely assaying the desired amounts. In addition, the use of a peristaltic pump is recommended due to the partially insoluble nature of the bile salts and the pancreatin. The presence of insoluble particles does not disrupt the operation of the peristaltic pump (within the specified concentration range) but would be capable of plugging the pipes connected to the buret or causing assaying uncertainties.

The intestinal digestion modeling time may be between 1 and 8 hours, and preferentially between 1 and 4 hours. However, as already explained, the aim of the present invention is to propose an in vitro method that is rapid to use and is in line with the in vivo results.

To this end, the intestinal digestion modeling time will be between 1 and 2 hours, and particularly will be of the order of 90 minutes.

Measurement of pH and Temperature

The continuous pH measurement in the method according to the invention may particularly be performed using a PHM290 controller (Radiometer analytical) or a Titralab 856 titration station (analytical radiometer) interfaced with a computer for the continuous recording of data and a pC2401-8 type pH probe.

Before use, the probe is calibrated using 2 standard solutions: pH 4 and 7.

The pH probe is then maintained above the stirrer blades so as not to disturb the viscosity measurement.

Similarly, the temperature of the reaction medium may be monitored continuously by means of a temperature probe maintained above the blades of the geometry so as not to disturb the viscosity measurement.

According to a particularly preferential embodiment, the invention relates to an in vitro method modeling and measuring the consistency generated in vivo by a dry food during the digestion thereof, comprising the following steps:

a. Grinding of 20 to 200 g of dry food until particles of an average size of the order of 500 μm (measured with a screen) are obtained;

b. Preparation of a solution modeling gastric fluid comprising 250 to 450 ml of water maintained at an acidic pH between 1 and 4 and a proteolytic enzyme for example such as pepsin, said enzyme being present at a concentration of approximately 0.25% by weight of the gastric fluid solution;

c. Mixing under stirring of the food obtained in a. with the solution obtained in b. in a reactor vessel coupled with a rheometer, for a time of the order of 70 minutes, said reactor being maintained at a temperature of the order of 37° C.;

d. Adjustment of the pH in the reactor to a value of approximately 6.3 and addition of 0.3% by weight of bile salts and 0.4% by weight of pancreatin, these percentages being expressed by weight with respect to the weight of the mixture contained in a reactor vessel, and maintenance of the mixture under stirring for a time of approximately 90 minutes, characterized in that the rheometer is equipped with a helical geometry stirrer used to homogenize the mixture and measure the viscosity and/or the viscoelasticity thereof.

In particular, the invention relates to an in vitro method modeling and measuring the consistency generated in vivo by a food during the digestion thereof, comprising the following steps:

a. Grinding of the food until particles of an average size between 5 microns and 3 mm;

b. Preparation of a solution modeling gastric fluid comprising water maintained at an acidic pH between 1 and 4 and a proteolytic enzyme for example such as pepsin, said enzyme being present at a concentration ranging from 0.025 to 2.5% by weight of the gastric fluid solution;

c. Mixing under vigorous stirring, for example between 50 and 300 s$^{-1}$, of the food obtained in a. with the solution obtained in b. in a reactor vessel coupled with a rheometer, for a time ranging from 2 to 30 minutes, said reactor between maintained at a temperature between 35 and 40° C., followed by adjustment of the pH to the target value between 1 and 4;

d. Mixing under stirring, for example between 1 and 100 s$^{-1}$, in the reactor vessel coupled with a viscosity and/or viscoelasticity measurement, for a time between 30 minutes and 4 hours, at a temperature between 36° C. and 38° C.

e. Performing a flow curve by progressively increasing the shear rate from 0.01 s$^{-1}$ to 1000 s$^{-1}$ for 1 to 10 minutes, and progressively decreasing the shear rate between 1000 s$^{-1}$ and 0.001 s$^{-1}$ for 1 to 10 minutes.

f. Mixing under vigorous stirring, for example between 150 and 300 s$^{-1}$, for a time from 2 minutes to 30 minutes, during which the pH is adjusted in the reactor to a value between 5 and 7.5 and 0.03 to 3% by weight of bile salts and 0.04 to 4% by weight of pancreatin are added, these percentages being expressed by weight with respect to the weight of the mixture contained in the reactor vessel, g. Maintenance of the mixture under shear, for example between 1 and 100 s$^{-1}$, for a time ranging from 1 to 8 hours at a temperature between 36° C. and 38° C., and h. Performing a flow curve by progressively increasing the shear rate from 0.01 s$^{-1}$ to 1000 s$^{-1}$ for 1 to 10 minutes, and progressively decreasing the shear rate between 1000 s$^{-1}$ and 0.001 s$^{-1}$ for 1 to 10 minutes.

The rheometer being equipped with a stirrer used to homogenize the mixture and measure the viscosity and/or the viscoelasticity thereof.

As explained above, the viscosity measurement devices and methods known from the prior art do not make it possible to measure the progress of the viscosity in a heterogeneous fluid medium continuously.

Therefore, according to another embodiment, the present invention relates to a continuous measurement method of the consistency of a mixture in a reactor vessel characterized in that viscosity and/or viscosity measurement device is equipped with a stirrer used to homogenize the mixture and measure the viscosity and/or viscosity thereof, said stirrer consisting of at least one helical blade rotated about a substantially vertical shaft, corresponding to that of the reactor and a radial support bar perpendicular to the shaft, located at the lower end of said shaft, as defined above.

The present invention also relates to a rheometer equipped with a stirrer used to homogenize the mixture and measure the viscosity and/or viscoelasticity thereof, said stirrer comprising at least one helical blade rotated about a substantially vertical shaft, corresponding to that of the reactor and a radial support bar perpendicular to the shaft, located at the lower end of said shaft, as defined above.

The invention also relates to a device used for in vitro measurement and the modeling of the consistency generated in vivo by a food during the digestion thereof, comprising a rheometer equipped with a stirrer used to homogenize the mixture and measure the viscosity and/or viscoelasticity thereof, said stirrer comprising at least one helical blade rotated about a substantially vertical shaft, corresponding to that of the reactor and a radial support bar perpendicular to the shaft, located at the lower end of said shaft, as defined above.

This invention will be presented in greater detail with the following examples.

EXAMPLE 1

Comparison Between a Rusk (Heudebert Fibers +) and a Biscuit (Lu Petit Déjeuner Coconut Hazelnut)

A quantity of 100 g of biscuit or rusk was ground for 20 seconds in a household mini-chopper (SEB Rondo 500). The following protocol was then used:

a) preparation of simplified gastric fluid (dissolution of 0.25% of pepsin and adjustment of pH to 2) with stirring at 100 $s^{-1}$ for 5 minutes, b) dispersion of the powder at 150 $s^{-1}$ for 20 minutes, followed by adjustment to pH2, c) gastric phase at 10 $s^{-1}$ for 70 minutes, d) flow curve from 0.01 $s^{-1}$ to 150 $s^{-1}$ followed by return from 150 $s^{-1}$ to 0.01 $s^{-1}$. The cycle is performed in 6 minutes (three minutes for the upward curve and three minutes for the downward curve), e) shift to intestinal conditions with raising of pH to 6.3, addition of 0.4% of pancreatin and 0.3% of bile salts, f) intestinal phase at 10 $s^{-1}$ for 90 minutes, g) flow curve from 0.01 $s^{-1}$ to 150 $s^{-1}$ followed by return from 150 $s^{-1}$ to 0.01 s-1. The cycle is performed in 6 minutes.

Figure 4:
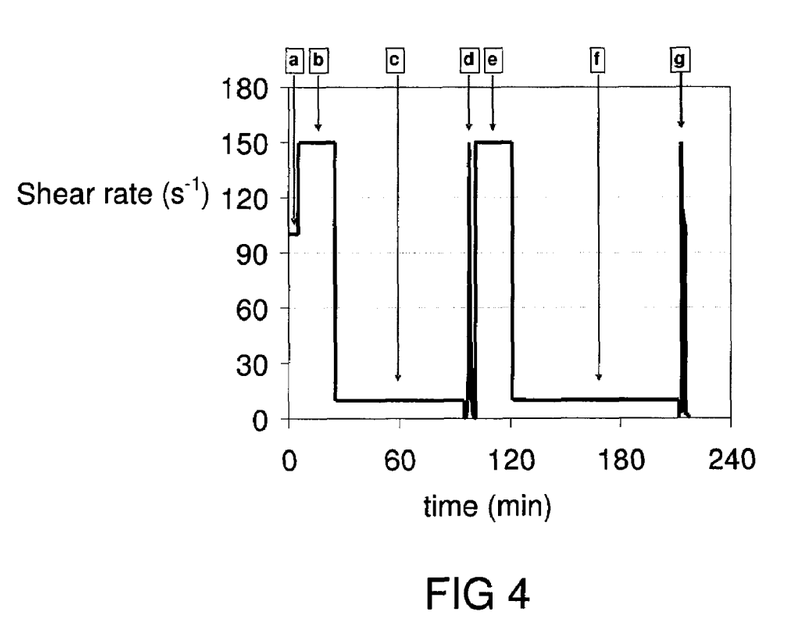
FIG. 4 represents various stages of the in vitro digestion protocol.
Figure 5:
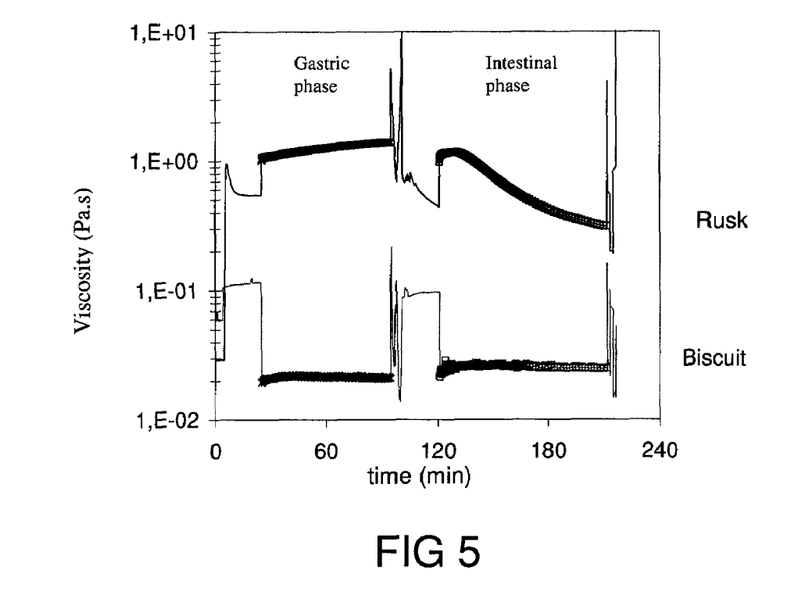
FIG. 5 represents the time-evolution of viscosity obtained with a biscuit and a rusk rich in fiber (quantity incorporated: 100 g in 350 ml). The gastric and intestinal phases are represented with a bold line.

FIG. 4 shows the various test phases:

FIG. 5 shows the viscosity profile obtained, the gastric (c) and intestinal (f) phases being distinguished by a bolder line (see graph). The behaviors observed are very different between the biscuit and the rusk.

The Petit Déjeuner biscuit induces a slight increase in viscosity and a very limited variation between the gastric and intestinal phases.

The rusk induces a significantly higher viscosity, which increases until the start of the intestinal phase, after which a progressive fall is observed.

These results may be interpreted on the basis of the state of the starch in the product. The starch is more or less completely gelatinized in the rusk, as the production process involves significant hydration of the dough and two successive heat treatments. During dispersion under gastric conditions, the development of viscosity is due to the solubilization of the amylose chains, which are high molar mass linear polysaccharides. Under intestinal conditions, the progressive fall in viscosity is probably due to the hydrolysis of the starch by intestinal pancreatin. Such a breakdown of the gelatinized starch by pancreatin has already been confirmed with other in vitro tests, demonstrating for example the appearance of simple carbohydrates (Englyst K. N., Hudson G. J., Englyst H. N., 2000, Encyclopedia of Analytical Chemistry, Meyers R. A. Chichester: John Wiley & Sons Ltd, 2000: 4246-4262). The methodology developed makes it possible to obtain a rheological signature of said process, which completes the results of the prior art.

In the case of a Lu Petit Déjeuner biscuit, native pseudo-crystalline structure of starch is preserved or only slightly altered. The variations in viscosity in the gastric and intestinal phases are therefore very limited, the amylose remaining in the starch grains. This confirms the measurements made in vitro (for example based on Englyst's methodology mentioned above) and in vivo, particularly the glycemic index measurements, demonstrating a progressive slow release of glucose and therefore a slowly digestible starch for these biscuits.

EXAMPLE 2

Incorporation of Native Guar Gum in a Biscuit

The operating conditions are identical to those in example 1, with the exception of a smaller incorporated quantity of biscuit: 50 g in 400 ml of gastric fluid.

Figure 6:
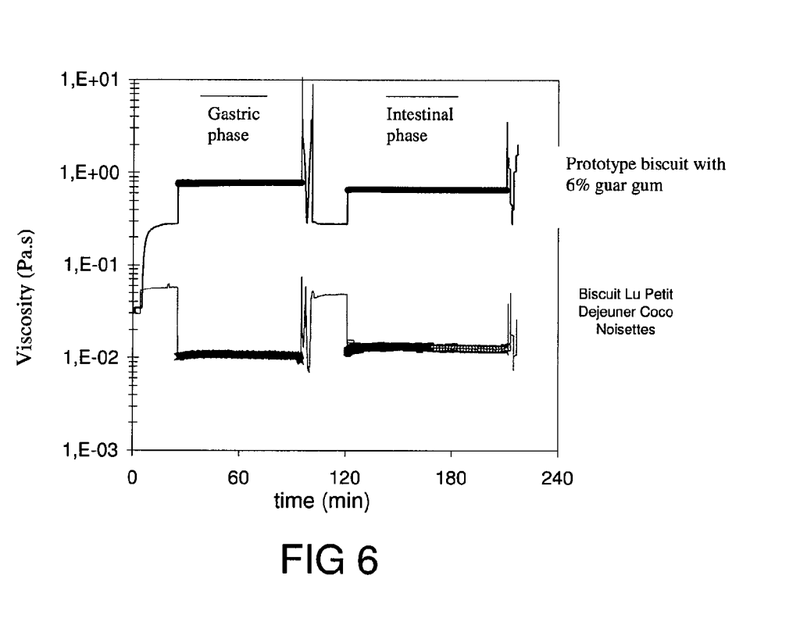
FIG. 6 represents the time-evolution of viscosity obtained with a commercial biscuit and a prototype containing 6% native guar gum (quantity incorporated: 50 g in 400 ml). The gastric and intestinal phases are represented with a bold line.

FIG. 6 shows the comparative variation for the viscosity for a control biscuit (Lu Petit Déjeuner Coco Noisettes) and a prototype biscuit containing 6% of native guar gum.

The kinetics are comparable, in that a viscosity plateau is rapidly reached. Guar gum is a polysaccharide soluble in cold water, which explains why the dissolution of guar gum is rapid at 37° C.

The apparent viscosity (at 10 s$^{-1}$) of the biscuit with guar gum is 50 times greater than the biscuit without guar gum under gastric conditions and similar to the viscosity of the rusk in example 1. However, unlike the rusk, the viscosity of the biscuit with guar gum does not fall under intestinal conditions. This is explained by the fact that guar gum is not sensitive to digestive enzymes and behaves like dietary fiber. Therefore, the in vitro protocol makes it possible to demonstrate dietary fiber viscosity is not affected by small intestinal digestion conditions.

EXAMPLE 3

Impact of Stirring Speed on Viscosity Variation Kinetics

The operating conditions are the same as those in example 2, with the exception of the stirring speeds in the gastric and intestinal phases, which vary between 3 values: 1, 10 and 100 s-1, with two repetitions for each of these speeds.

Figure 7:
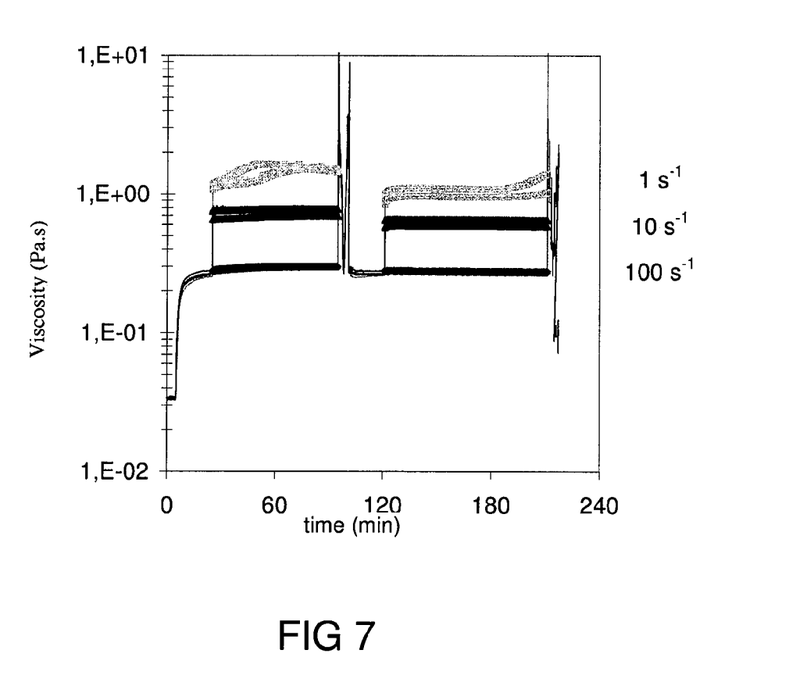
FIG. 7 represents the time-evolution of viscosity obtained with a prototype containing 6% native guar gum (quantity incorporated: 50 g in 400 ml). Three different rates were used in the gastric and intestinal phases, represented with a bold line.

The biscuit containing 6% native guar gum in example 2 is incorporated at a rate of 50 g in 400 ml of gastric fluid. FIG. 7 shows the results obtained:

Irrespective of the speed, the dissolution of the guar is complete after the 20 minutes of dispersion at 150 s$^{-1}$ and 37° C. The viscosity is constant in the gastric and intestinal phases. However, the apparent viscosities measured with a speed of 1 s$^{-1}$ are irregular, which could convey slow movements of the reaction mixture. At 10 s$^{-1}$ and 100 s$^{-1}$, a lower, but more regular and more reproducible, level of viscosity than 1 s$^{-1}$ is observed.

Figure 8:
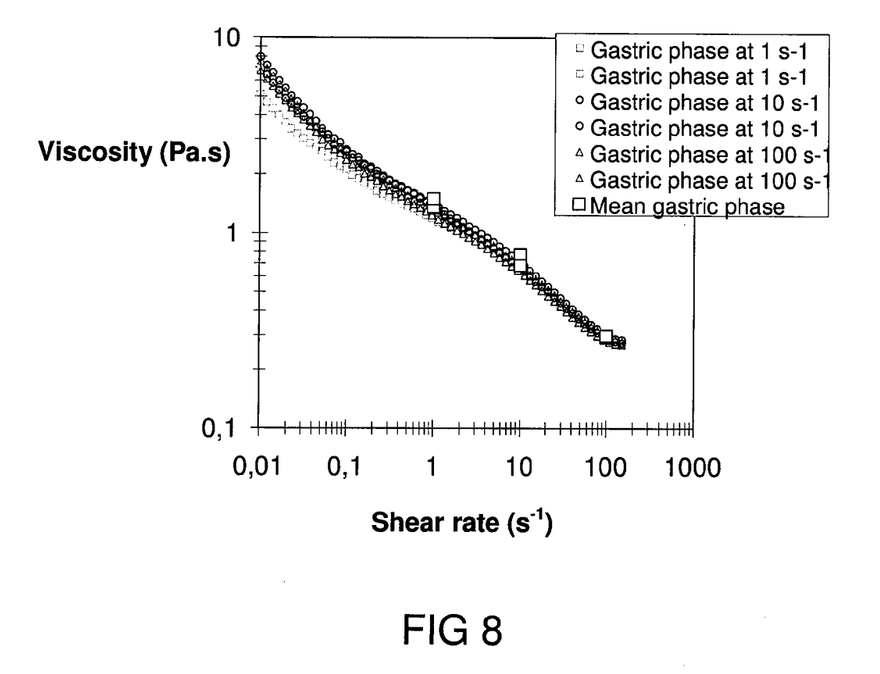
FIG. 8 represents the flow curves obtained at the end of the gastric phase with a prototype containing 6% native guar gum (quantity incorporated: 50 g in 400 ml). The white squares represent the average apparent viscosity values measured during the intestinal phases at the different rates (1, 10 and 100 s-1).
Figure 9:
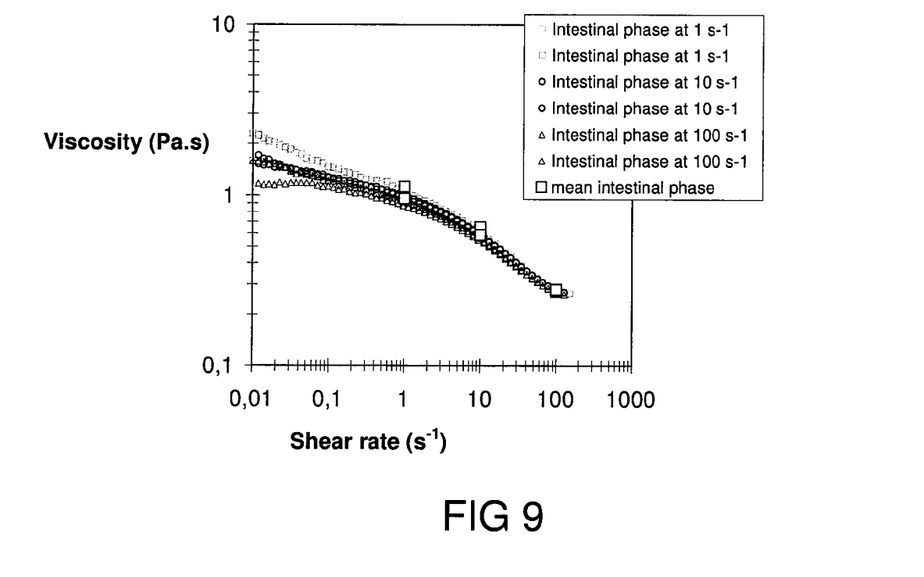
FIG. 9 represents the flow curves obtained at the end intestinal phase with a prototype containing 6% native guar gum (quantity incorporated: 50 g in 400 ml). The white squares represent the average apparent viscosity values measured during the intestinal phases at the different rates (1, 10 and 100 s-1).

The flow curves obtained at the end of the gastric and intestinal phases after stirring at the speeds specified (1, 10 and 100 s$^{-1}$) are shown in FIGS. 8 and 9. The mean apparent viscosity measured in the gastric and intestinal phases at the three speeds is also indicated.

The flow curves are practically superimposable, in spite of significant differences in the apparent viscosity values in the gastric and intestinal phases, according to the shear rate.

This result shows that the native guar gum solubilization kinetics are not dependent on the shear rate applied during the gastric phase, which varies however between 1 and 100 s$^{-1}$. The apparent viscosity variations observed are associated with the shear-thinning behavior of guar gum solutions (i.e. the decrease in apparent viscosity with the shear rate). This is confirmed by the fact that the mean values obtained in the gastric and intestinal phases (symbolized by unfilled squares in FIGS. 5 and 6) superimpose well with the flow curves obtained at the end of these phases.

EXAMPLE 4

Measurement of the Change in Viscoelasticity Under Artificial Digestion Conditions An amount of 40 g of Oatwell 22 oat bran (Swedish Oat Fibers—SOF—and CreaNutrition), with a median particle size of around 120 microns, was used as a replacement for the ground biscuit powder of examples 1 to 3. The following protocol was used:

a) preparation of simplified gastric fluid using the automatic burets: An amount of deionized water of 408 mL is first added to the 40 g of bran, which corresponds to a bran concentration of 8.9 (in weight/weight %).
3 ml of concentrated pepsin solution at pH 2 were then assayed.
At the end of this addition, the contents of the vessel are acidified to the target value of pH 2. The total time of this cycle is around 5 minutes.
b) dispersion of the powder at 150 s$^{-1}$ for 20 minutes, then, before the end of this phase, adjustment to pH2 using the automatic buret,
c) stop of the flow and performing harmonic measurements at a constant frequency of 1 Hz and a strain of 0.1% The total time of this phase is 15 hours.
d) strain sweep from 0.1 to 100% at 1 Hz for 3 minutes.

Figure 10:
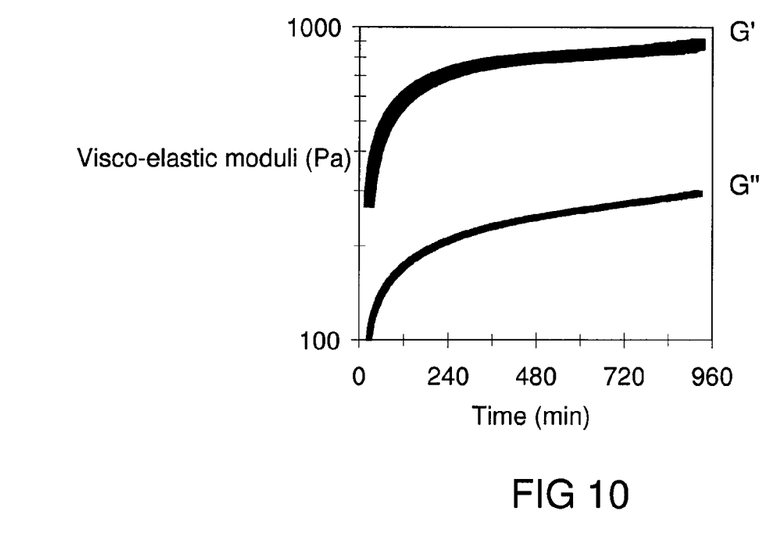
FIG. 10 represents the change in the viscoelastic moduli during artificial digestion of oat bran incorporated in an amount of 40 g in 408 ml of liquid under gastric conditions.

FIG. 10 shows the evolution of the viscoelastic moduli during artificial digestion. It is observed that, once the kinetics begin, the elastic modulus is greater than the viscous modulus (at the frequency and strain considered), indicating a dominant solid behavior. The viscoelastic moduli then increase progressively over time (a factor of around 3 in 15 h), showing that the sample continues to structure.

Figure 11:
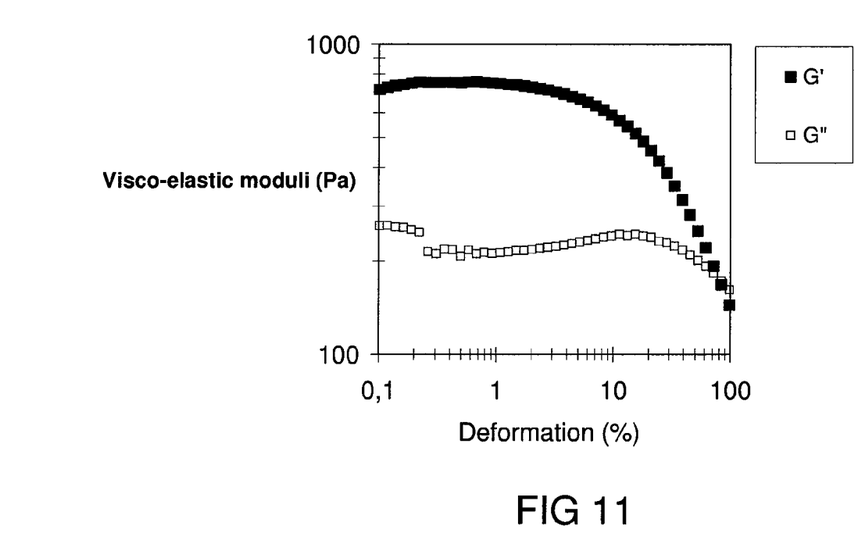
FIG. 11 represents the change in the viscoelastic moduli during a strain sweep (0.1 to 100%) performed after 15 h of gastric digestion for oat bran incorporated in an amount of 40 g in 408 ml.

The strain sweep obtained after 15 h under gastric conditions is shown in FIG. 11. The elastic modulus remains greater than the viscous modulus over a wide range of strain, then at strain larger than around 80%, the viscoelastic moduli intersect and the viscous behavior becomes dominant.

All of these observations suggest a rheological behavior of the "weak gel" type, with a dominant solid behavior at low strain and a dominant liquid behavior beyond a critical strain.

The invention claimed is:

1. An in vitro method effective for modeling and measuring consistency generated in vivo by a food during digestion thereof, the method comprising:
   a. grinding the food, the grinding effective for reproducing mechanical breakdown performed during chewing to provide a ground food;
   b. mixing the ground food with a solution modeling gastric fluid in a reactor vessel coupled with a rheometer, for a time corresponding to gastric digestion to provide a reaction mixture;
   c. adjusting the reaction mixture to model intestinal digestion conditions for a time corresponding to intestinal digestion; and
   d. measuring the viscosity and/or viscoelasticity of the reaction mixture via the rheometer in the reactor vessel, wherein the rheometer is provided with a stirrer effective for homogenizing the reaction mixture and measuring viscosity and/or viscoelasticity.

2. The method according to claim 1, wherein when the viscosity of the reaction mixture is measured, the rheometer homogenizes the reaction mixture and measures the viscosity thereof simultaneously.

3. The method according to claim 1, wherein when the viscoelasticity of the reaction mixture is measured, the rheometer homogenizes the reaction mixture and measures the viscoelasticity thereof consecutively.

4. The method according to claim 1, wherein the food is a dry food.

5. The method according to claim 1, wherein the food obtained following grinding is in a form of particles of at least 5 μm in size.

6. The method according to claim 1, wherein the solution modeling gastric fluid comprises water maintained at an acidic pH between 1 and 4 and a proteolytic enzyme, said enzyme being present at a concentration ranging from 0.025 to 2.5% by weight of the gastric fluid solution.

7. The method according to claim 1, wherein the mixing of the ground food and the solution modeling gastric fluid is performed under stirring in a thermostatically-controlled reaction containment maintaining a temperature from 35 to 40° C. for a period ranging from 30 minutes to 4 hours, in which said containment is coupled with a viscosity and/or viscoelasticity measurement device.

8. The method according to claim 1, wherein the modeling of the intestinal digestion conditions is performed by adjusting the pH in the reactor to a value between 5 and 7.5 and adding 0.03 to 3% by weight based on weight of the reaction mixture, of bile salts and 0.04 to 4% by weight based on weight of the reaction mixture, of pancreatin, said reaction mixture being maintained under stirring for a time ranging from 1 to 8 hours.

9. The method according to claim 1, wherein the stirrer comprises at least one helical blade rotated about a substantially vertical shaft, corresponding to that of a reactor and a radial support bar perpendicular to the shaft, located at the lower end of said shaft.

10. The method according to claim 9, wherein the stirrer comprises between 2 and 6 coaxial helical blades, arranged symmetrically with respect to the vertical shaft.

11. The method according to claim 10, wherein helical blade(s) comprise(s) between one half and several spiral pitches or turns.

12. The method according to claim 11, wherein the stirrer comprises two coaxial helical blades, symmetric with respect to the vertical shaft, comprising one spiral turn, connected together at a lower end thereof by the support bar, at the upper end thereof by the second radial bar, parallel with the support bar, and on a level with a one half-turn, by a third bar parallel with the support bar.

13. The method according to claim 1, wherein the stirrer is made of stainless steel.

14. The method according to claim 1, wherein the viscoelasticity measurements, when the consistency of a bolus becomes viscoelastic, are performed by low strain oscillatory measurements.

15. The method according to claim 14, wherein the viscoelasticity measurement steps, when the consistency of the bolus becomes viscoelastic in the gastric and/or intestinal phase, includes the following steps:
   a. obtaining a homogeneous mixture in step a and/or step b;
   b. measuring the viscoelasticity of the homogeneous mixture in step a and/or step b by oscillatory measurements with a sinusoidal strain between 0.01% and 1%, at a frequency between 0.01 Hz to 10 Hz.

16. The method of claim 5, wherein the food obtained following grinding has a particle size of between 5 µm and 3 mm.

17. The method of claim 6, wherein the proteolytic enzyme is pepsin.

* * * * *